United States Patent [19]

Kampe

[11] Patent Number: 5,433,458
[45] Date of Patent: Jul. 18, 1995

[54] DOG SLED

[75] Inventor: Geoff Kampe, Conifer, Colo.

[73] Assignee: Southern Cross Designs, Littleton, Colo.

[21] Appl. No.: 270,264

[22] Filed: Jul. 5, 1994

[51] Int. Cl.⁶ ............................................. B62C 1/04
[52] U.S. Cl. ................................. 280/14.3; 280/22; 280/22.1; 280/24
[58] Field of Search .................. 280/21.1, 22, 22.1, 280/14.1, 14.2, 14.3, 16, 25, 26, 24

[56] References Cited

U.S. PATENT DOCUMENTS

| | | | |
|---|---|---|---|
| 3,370,862 | 2/1968 | Huffnagle | 280/22.1 |
| 4,326,725 | 4/1982 | Lagervall | 280/22.1 |
| 4,334,691 | 6/1982 | Scheib | 280/22.1 |
| 4,453,742 | 6/1984 | Zepkowski | 280/22.1 |
| 5,205,570 | 4/1993 | Brown | 280/14.2 |
| 5,335,925 | 8/1994 | Dolson | 280/22.1 |
| 5,344,167 | 9/1994 | Strouth | 280/22.1 |

FOREIGN PATENT DOCUMENTS 736392  6/1966  Canada ................ 280/22.1

*Primary Examiner*—Richard M. Camby
*Attorney, Agent, or Firm*—Charles C. Corbin

[57] ABSTRACT

Disclosed is a dog sled that has improved steering capabilities, and includes spaced-apart sideframes and a plurality of rigid cross ties that hold the sideframes spaced apart in parallel relationship, the cross ties connecting to the side frames by flexible joints, and a flexible bumper or brush bow interconnects front ends of the sideframes. A runner is secured to each sideframe, the front end of the runner connects to the front of the sideframe and a central part of the runner connects to the lower end of the sideframe, providing the runner with a long, rearwardly extending portions. A handle extends transversely from the upper part of one sideframe to the upper part of the other sideframe, and each opposite end of the handle pivotally connects to the sideframe for rotation about an axis in the vertical plane of the sideframe and inclined at a substantial angle between the horizontal and the vertical. Lateral movement of the handle, to one side or the other, will tilt the sideframes and attached runners, and simultaneously one runner will be staggered longitudinally ahead of the other in a manner appropriate for turning the sled.

12 Claims, 3 Drawing Sheets

DOG SLED

BACKGROUND OF THE INVENTION

1. Field of the Invention

The present invention relates to a dog sled and more particularly to a dog sled having enhanced steering capability.

2. Description of the Prior Art

The conventional dog sled customarily has a construction that includes a pair of parallel runners or skids with upturned forward portions, a brush bow or bumper that interconnects the front ends of the runners, side frames connected by cross members, and a transverse handle that joins the tops of a pair of generally upright side members. The driver grasps the handle and stands on elongate rearward portion of the runners. Steering of these typically rigidly constructed sleds is accomplished by the driver shifting his or her weight to the runner on the side in the direction of the turn, in conjunction with having the dogs pull the front of the sled in this direction.

Unfortunately there are several drawbacks associated with steering conventionally constructed dog sleds, and these drawbacks are of greater concern in the sport of dog sled racing. The problem is that the turning of a conventional dog sled is inefficient and cumbersome, and is lacking in control and precision. First, is noted that an appreciable amount of side skidding tends to occur when a conventional sled is turned. Also, the drag generated at the runner/snow interface is excessive during such turns, and this requires increased exertion by the dogs. Moreover, the driver will expend a fair amount of exertion in shifting his weight and manipulating the sled in an attempt to compensate for the limited steerability of the sled.

An additional problem of conventional sleds is that they are difficult to maintain in the intended path when traversing sloped terrain, and extraordinary efforts by the driver, such as inclining the entire sled so that it rides only on the uphill runner, is required in order to keep the sled from side-slipping down the slope. It is further noted that when the driver stands directly upon the runners, flexing of the runners in response to uneven surfaces is inhibited, which hinders shock absorbency and efficient tracking.

U.S. Pat. No. 1,754,011 and U.S. Pat. No. 5,205,570 show what are essentially rigid dog sled structures, although U.S. Pat. No. 1,754,011 purports to provide some increased steerability by having the driver rest with one foot on one runner while using the other foot to bend the other runner. Efforts at increased steerability in sleds is shown in the ski sled of U.S. Pat. No. 2,209,830 where a pair of standard skis is mounted to a frame that is laterally tiltable, but otherwise essentially stiff. U.S. Pat. No. 4,796,902 shows a steerable ski sled that has a steering wheel that is used in the manner of a conventional vehicle steering wheel, and involves multiple pairs of runners and a steering train of multiple linkages. Such a construction is complex and would not lend itself to the sport of dog sled racing where the driver stands and drives the dogs and the sled from the rear of the sled.

SUMMARY OF THE INVENTION

In view of the aforstated shortcomings in the prior art, it is a general object of the present invention to provide a dog sled that has an enhanced steering capability.

A more specific object of the invention is to provide a dog sled having runners that are maneuverable in a fashion that simulates the movement of a skier's skis when the skier makes an effective and efficient turn.

Another object is to provide a sled having runners that can be maneuvered in a manner that tilts the runners while simultaneously staggering them in the appropriate direction to hold them in a posture for efficient and effective turning.

A related object is to provide a dog sled that minimizes physical exertion by the dogs and the driver during turning.

Yet another object of the invention is to provide a dog sled having a construction that does not hamper flexion of its runners over uneven surfaces.

Still another object is to provide such a dog sled that can traverse sloped terrain without side-slipping.

These and other objects and advantages are achievable by the present invention of an advanced dog sled that includes a pair of spaced-apart sideframes, each including a lower end, a front end an upper end, and plurality of rigid cross ties that interconnect the sideframes by flexible universal-type joints, and which hold the sideframes in spaced-apart relationship. A flexible brush bow interconnects the front end of the sideframes by way of connections that allow the side frames the freedom to be laterally tilted and longitudinally shifted. A runner is attached to the lower end and front end of each sideframe by connections that are pivotal about transverse axes, such that the runners will be tilted about their longitudinal axes when the sideframes are tilted. The invention also features a rigid handle that extends transversely from the upper end of one sideframe to the upper end of the other sideframe, and the handle has opposite ends that are pivotally connected to the sideframes for rotation about axes in the vertical plane of the sideframe, these axes being oriented at angles that are substantially inclined to the vertical and the horizontal. Finally the invention is seen to include spring means that interconnect the sideframe so as to resiliently urge the sideframes to a normal, squared position in which the sideframes are upright in lateral alignment. When the handle is moved laterally, to one side or the other, the sideframes and attached runners will be tilted, and the inclined pivotal connections between handle and sideframes are such that one end of the handle will be forced in front of the other, causing the sideframes and attached runners to be staggered, giving the runners the attitude and posture appropriate for efficient and effective turning.

In a preferred embodiment of the invention, enhanced flexion and tracking of the runners, and increased shock-absorbency, are provided by the use of an elongate riding board that extends just above each runner from a transverse pivotal connection near the rear end of the runner to a second transverse pivotal connection adjacent the lower end of the sideframe. Thus a substantial part of each runner, between the connection points of the riding board, is free to flex in response to uneven terrain. Additionally, in the preferred embodiment, the front end of each runner is connected to the front of the side frame by a linking arm that is pivotally connected at one end to the runner, and at the other end to the side frame for movement about transverse axes, so as to allow desirable flexure of the forward portion of each runner.

DETAILED DESCRIPTION OF THE INVENTION

Figure 1:
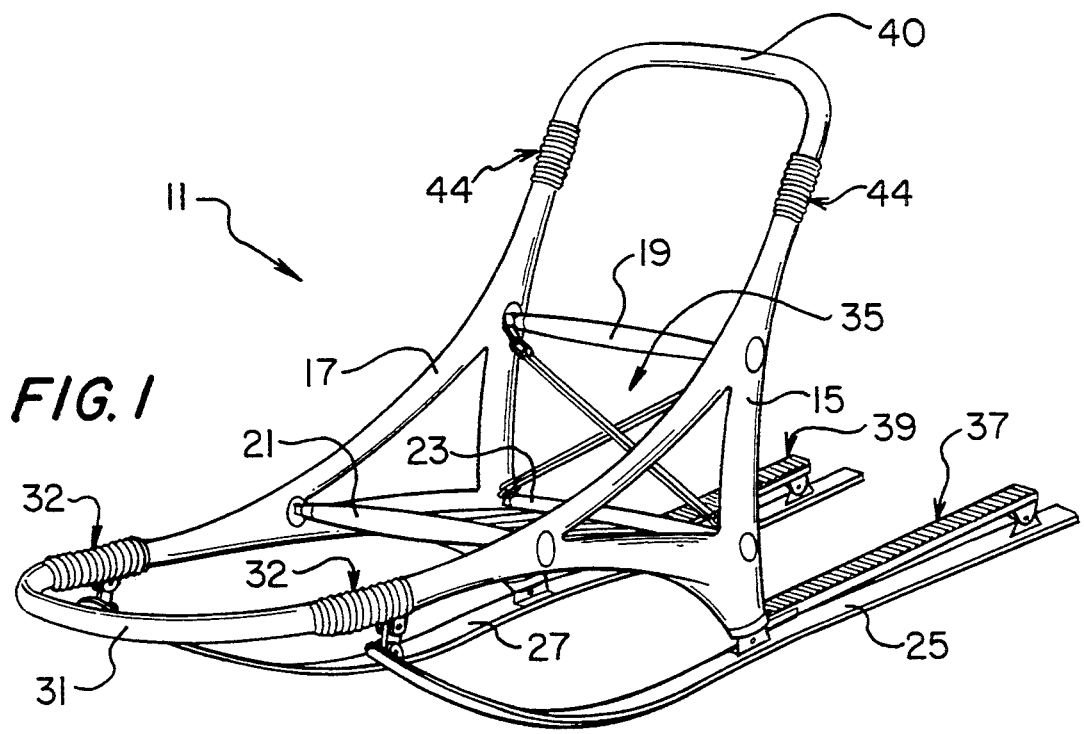
FIG. 1 is a perspective view showing a preferred embodiment of a dog sled according to the present invention.

Referring now to the drawings, FIG. 1 shows that the main components of a dog sled 11, according to the present invention, include sideframes 15 and 17, cross ties 19, 21, and 23, runners 25 and 27, a brush bow 31, a spring assembly 35, so-called secondary runners or riding board assemblies 37 and 39, and a handle 40.

Figure 3:
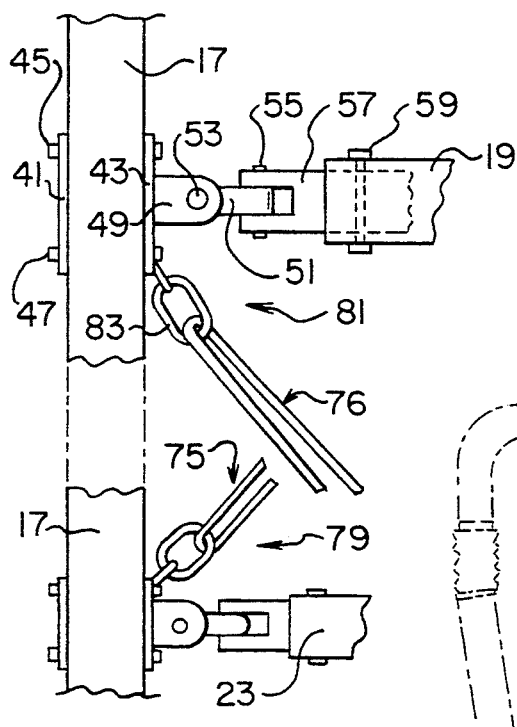
FIG. 3 is a partial, enlarged front elevational view of the cross tie connections.
Figure 2:
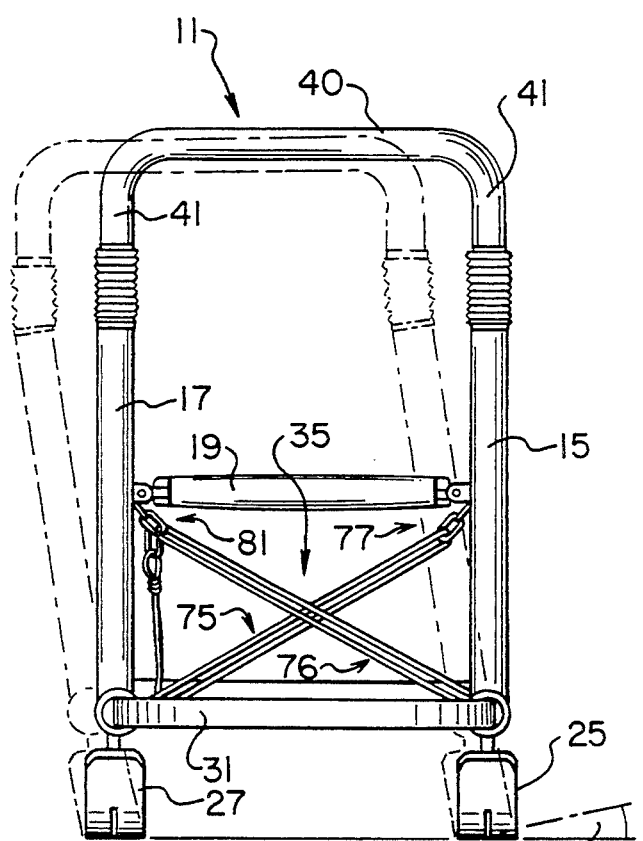
FIG. 2 is a front elevational view of the sled of FIG. 1.

The sideframes 15 and 17, cross ties 19, 21 and 23 and handle 40 are preferably molded in a lightweight, high strength material, and in the preferred embodiment 11, these components are tubular structures of a carbon fiber composite, molded using techniques known in the industry. The cross ties 19, 21 and 23 hold the side frames spaced apart in parallel relationship and are connected to side frames 15 and 17 by flexible or universal joints as best seen in FIGS. 2 and 3. The enlarged view of FIG. 3 shows typical cross tie to side frame connections. Note ill FIG. 3 how anchor plates 41 and 43 are secured with threaded fasteners of 45 and 47 to frame 17, plate 43 having a clevis 49. A link 51 has one end that is pivotally connected to the clevis 49 for rotation about a connector pin 53, the other end of link 51 providing a bore that receives a connector pin 55 of a clevis fitting 57. A bushing of a suitable polymeric material, such as material sold on the trademark NYLATRON, (not shown), mounts the pin 55 in the vertical bore of link 51 as viewed in FIG. 3. The other end of the clevis fitting 57 is secured within the hollow end of cross tie 19 by a fastener 59. Thus a pair of orthogonally arranged axes of rotation are provided to allow universal freedom of rotation of the cross tie 19 with respect to the sideframe 17.

Figure 5:
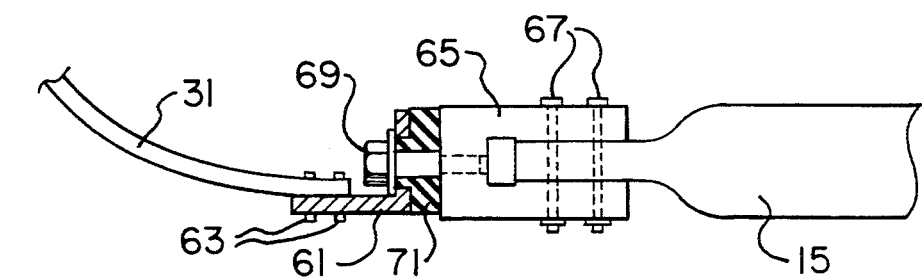
FIG. 5 is an enlarged, partial top elevational view showing the brush bow connection.

The brush bow 31, shown in FIG. 1, 2, 4 and 5 is preferably comprised of a band of durable, resilient polymeric material such as an ultra high molecular weight (UHMW) material. FIG. 5 best illustrates how the brush bow 31 is connected to the front ends of the side frames 15 and 17. A bracket 61 is affixed to the end of brush bow 31 by fasteners 63. Another bracket 65 having a threaded bore 66 is secured to the end of sideframe 15 by fasteners 67. Finally a bolt 69 is secured in the bore 66, to connect the bracket 61 to the other bracket 65 by way of a NYLATRON bushing 71. Thus the brush bow 31 is firmly secured to sideframe 15 while allowing rotation of sideframe 15 relative to the brush bow. This feature, and the flexibility of the brush bow 31 will ensure that tilting and staggering of the sideframes will not be hampered when the sled 11 is steered, in a manner to be described. It is preferrable to use conventional flexible rubber covers 32, shown in FIG. 1, to protect the abovedescribed brush bow-to-sideframe joints from the elements.

The spring means 35 comprises a first elastic cord bundle 75 that extends diagonally from an anchor point 77, shown in FIG. 2 on sidewall 15, to a lower anchor point 79 shown in FIG. 3 on the other sidewall 17. There is a second diagonally disposed elastic cord bundle 76. The anchor point 81 is typical, and includes a ring 83 that is connected to the anchor plate 43, and through which ring the bundle 76 is tied. It will be seen that the elastic bundles 75 and 76 will act to urge the sideframes 15 and 17 towards a normal upright, side-by-side position. It should also be appreciated that the stiffness of sled 11 can be adjusted by appropriately varying the number, size and strength of the elastic cords that comprise the bundles 75 and 76.

Figure 4:
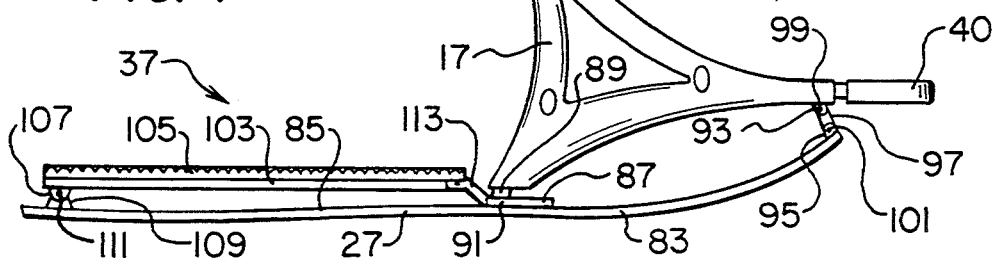
FIG. 4 is a side elevational view of the sled of the invention.

Each runner 25 and 27 has a laminated construction similar to that of a conventional ski, and includes an upper layer of a carbon fiber composite, and a lower layer of a high molecular weight polymeric material. As FIG. 4 shows, runner 25 has an upwardly curved forward portion 83 and a generally straight main portion 85. A bracket 87 is bolted to the runner 25 and the lower end 89 of side frame 17 is connected to bracket 87 by a pin 91 in a manner to allow some pivoting of the runner 25 about the axis of pin 91. The front end of runner 25 is connected to frame 17 by a linkage that provides a certain amount of forward and rearward movement of the runner front end relative to the frame. Accordingly, a clevis 93 on frame 15 is connected to a clevis 95 on runner 25 by way of a pair of links 97, pivotal connections being provided by horizontal pins 99 and 101. The pins 99, 91 and 111 are preferably of a type that can be removably latched in place. Thus runners can be readily disconnected and removed from the sled. This feature allows one set of runners to be quickly replaced by another set of runners of a different width, as required by snow conditions.

The secondary runner or riding board assembly 37, shown in FIG. 4, includes a carbon fiber composite board 103 to which is secured by adhesive or other suitable means a non-slip rubber-like tread 105. At the rear end of board 103 is secured a clevis 107 that is pivotally connected to a clevis 109 on runner 25, by way of the horizontal pin 111. Note that the front end of board 103 has a bracket 113 that connects to the runner bracket 87 by way of the pin 91. This arrangement allows the driver's weight to be spread apart, allowing maximum flexion of runner portion 85 that subtends the board 103.

Figure 6:
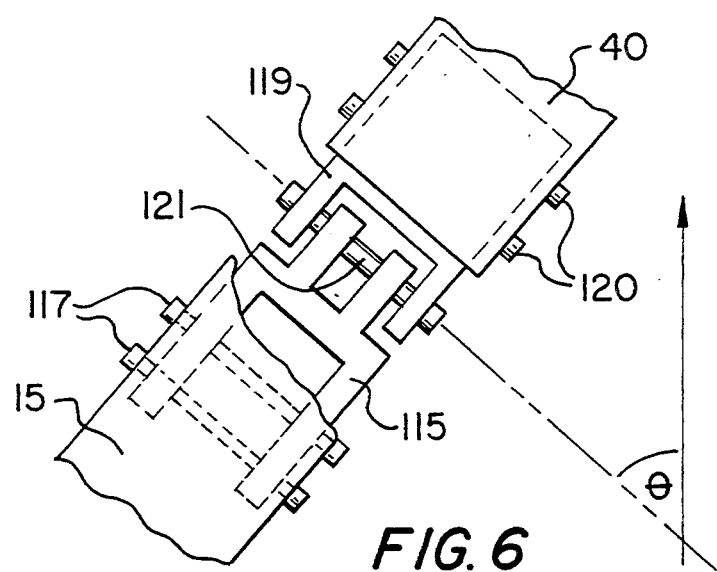
FIG. 6 is an enlarged, partial, sectional view of the handle-to sideframe connection.

As FIGS. 4 and 6 show, the handle 40 has opposite ends that are connected to frames 15 and 17 respectively by pivotal connections, the connection shown in FIG. 6 being typical. First note that a clevis fitting 115 is secured in frame 15 by fasteners 117. A complementary clevis fitting 119 is secured in the end of handle 40 by fasteners 120. A pin 121 pivotally connects one clevis to the other by way of a NYLATRON bushing 123 mounted in bores in the clevis 115. Also, note that the pivot pin 121, that lies in the general vertical plane of the 15, is inclined to the vertical by an angle $\theta$ which is preferably about 55°±10°. Pivot pin 121 is peferablly of the type that can be removably latched in place. It is preferable to use conventional flexible rubber covers 44, shown in FIG. 1, to protect these handle-to-sideframe joints from the elements. Note that handle 40 can be said to have a given "height", as measured by the length of its side portions 41 indicated in FIGS. 2 and 4. An additional advantage of the sled 11 is that a given handle 40 can be readily unpinned and replaced with another handle of a different height. Thus the invention can be adjusted to accommodate drivers of different heights.

Figure 7:
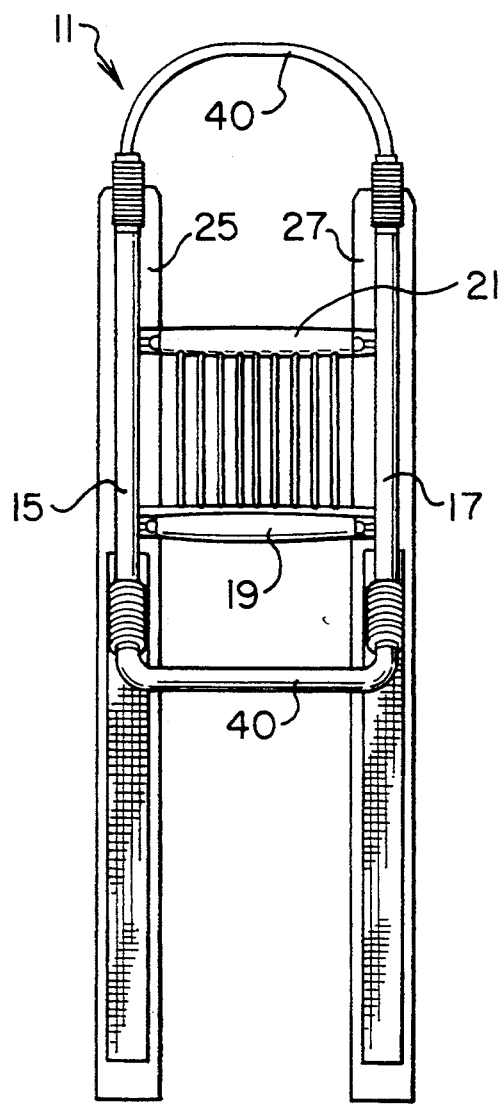
FIG. 7 is a top plan view of the sled of the invention.
Figure 8:
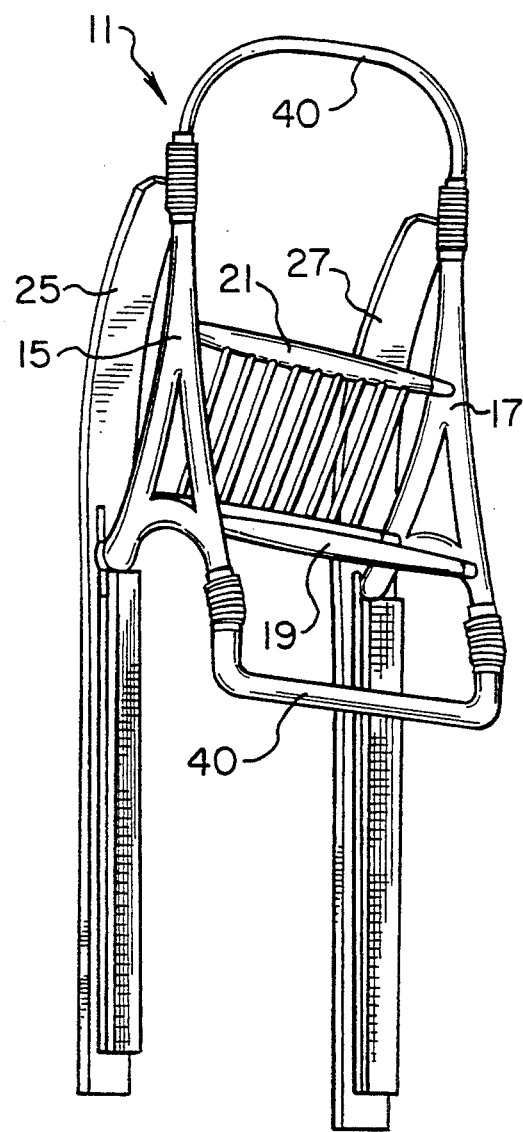
FIG. 8 is a view similar to FIG. 7, but showing the inventive sled in turning configuration.

In order to steer the sled 11, the above described components cooperate in a manner to tilt the runners, as well as stagger one runner in front of the other, when the handle 40 is manipulated laterally. First, by moving handle 40 to one side, the flexibly connected side frames 16 and 17 will be accordingly tilted along with their respective runners 25 and 27. This tilted configuration is illustrated in phantom lines in FIG. 2, in which a right turn is indicated. It will also be discovered, by virtue of the angular displacement $\theta$ of the connecting pin of handle 40, that the left hand side of handle 40 as viewed in FIGS. 7 and 8 will be urged forward by forces generated at each pivotal connection of the handle 40. It will become apparent that the amount of turning force at the handle connection, and the extent of the resulting staggering of runners will vary according to the size chosen for angle $\theta$. When handle 40 is returned towards the normal position of FIG. 7, with the assistance of spring means 35, the runners will be leveled and urged towards their normal laterally aligned position. From the forgoing it will be obvious how left turns are made.

While a certain preferred embodiment of the invention has been described, it should be understood that the invention is not limited thereto, since there are many variations that will be readily apparent to those skilled in the art, given the benefit of this disclosure. Thus it is intended that the invention be given the broadest possible interpretation within the terms of the claims which follow.

What is claimed is:

1. A dog sled, including:
   a. first and second spaced-apart sideframes, including a lower end, a front end, and an upper end;
   b. a plurality of rigid cross ties that interconnect the sideframes by flexible joints, for holding said sideframes in spaced-apart parallel relationship, and allowing said side frames to be laterally tilted about a longitudinal axis as well as longitudinally staggered, one sideframe with respect to the other;
   c. a brush bow interconnecting the front ends of said sideframes in a manner that allows said sideframes the freedom to be laterally tilted and to be longitudinally staggered;
   d. a first and a second runner, each having a front end, a central part and a rearward part, and a longitudinal axis, the lower end of one sideframe secured to the central part of the first runner, and the front of said sideframe connected to the front end of said first runner, and said other runner similarly secured and connected to the other sideframe, whereby tilting of said side frames will cause tilting of said runners about their longitudinal axes;
   e. a handle extending transversely from the upper end of said first sideframe to the upper end of said second sideframe, said handle having opposite ends that are pivotally connected respectively, to the upper ends of said first and second sideframes, for rotation about axes in the vertical planes of said sideframes, said axes oriented at an angle that is substantially inclined to the vertical and the horizontal;
   f. spring means interconnecting said side frames for resiliently urging said sideframes to a normal position in which said sideframes are upright and in lateral side-by-side alignment; and
   g. wherein lateral movement of said handle, to one side or the other, will tilt said sideframes and cause the runners to be tilted about their longitudinal axes, and wherein forces are generated at said pivotal connections between handle and sideframes to urge said sideframes to a longitudinally staggered position.

2. A dog sled as defined in claim 1 wherein each of said flexible joints includes a first hinge and a second hinge, the axes of said hinges at right angles to each other.

3. A dog sled as defined in claim 1 wherein the front end of each of said runners is connected to a sideframe by a connector that is adapted to hold each of said runners front end against twisting movement relative to said sideframe, while permitting a predetermined amount of relative longitudinal movement each said of runners to said front end.

4. A dog sled as defined in claim 3 wherein said connector includes a link member having one end pivotally mounted to said sideframe, and an opposite end pivotally connected to said runner front end, said pivotal connections having transversely extending axes.

5. A dog sled as defined in claim 1 wherein the lower end of each of said sideframes is secured to a runner by a connector that has a single pivotal joint for motion about a transverse axis.

6. A dog sled as defined in claim 1 wherein said spring means includes diagonally disposed elastic cords.

7. A sled as defined in claim 1 wherein the opposite ends of said brush bow are rotatably connected to the front ends of said sideframes for rotation about longitudinal axes.

8. A dog sled as defined in claim 1 including an elongate longitudinally extending riding board spaced above the rearward part of each of said runners, and having a front end that is pivotally connected about a transverse axis to the central part of each of said runners, and a rear end that is pivotally connected, about a transverse axis, to the rearward part of each of said runners.

9. A dog sled as defined in claim 8 wherein said riding board includes an upper layer of non-slip material.

10. A dog sled as defined in claim 1 wherein the axis of said handle hinge is inclined at about 55° to the horizontal.

11. A dog sled as defined in claim 10 wherein said angle is in the range of 45° to 65°.

12. A dog sled as defined in claim 1 wherein said brush bow is a resilient flexible band of polymeric material.

* * * * *